US009126361B2

(12) United States Patent
Schreiber

(10) Patent No.: US 9,126,361 B2
(45) Date of Patent: Sep. 8, 2015

(54) METHOD FOR THE MANUFACTURE OF HYBRID COMPONENTS FOR AIRCRAFT GAS TURBINES

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 611 days.

(21) Appl. No.: 12/621,640

(22) Filed: Nov. 19, 2009

(65) Prior Publication Data

US 2010/0126662 A1   May 27, 2010

(30) Foreign Application Priority Data

Nov. 25, 2008 (DE) .......................... 10 2008 058 913

(51) Int. Cl.
| | | |
|---|---|---|
| *B29C 59/14* | (2006.01) | |
| *B32B 38/00* | (2006.01) | |
| *B29C 70/02* | (2006.01) | |
| *B08B 7/00* | (2006.01) | |
| *B29C 65/00* | (2006.01) | |
| *B29C 70/08* | (2006.01) | |
| *F01D 5/14* | (2006.01) | |
| *F01D 5/28* | (2006.01) | |
| *F04D 29/02* | (2006.01) | |
| *F04D 29/32* | (2006.01) | |
| *F04D 29/38* | (2006.01) | |
| *F04D 29/54* | (2006.01) | |
| *B29C 65/48* | (2006.01) | |
| *B29L 31/08* | (2006.01) | |
| *B29L 31/00* | (2006.01) | |

(52) U.S. Cl.
CPC ............... *B29C 59/14* (2013.01); *B08B 7/0042* (2013.01); *B29C 65/48* (2013.01); *B29C 66/721* (2013.01); *B29C 66/742* (2013.01); *B29C 70/028* (2013.01); *B29C 70/088* (2013.01); *B32B 38/0008* (2013.01); *F01D 5/147* (2013.01); *F01D 5/282* (2013.01); *F04D 29/023* (2013.01); *F04D 29/324* (2013.01); *F04D 29/388* (2013.01); *F04D 29/542* (2013.01); *B29C 66/028* (2013.01); *B29L 2031/082* (2013.01); *B29L 2031/7504* (2013.01); *Y02T 50/672* (2013.01)

(58) Field of Classification Search
CPC .. B29C 70/028; B29C 65/64; B29C 65/7234; B29C 59/14; B29C 66/028; B32B 38/0008
USPC ........................................ 156/272.6; 264/261
See application file for complete search history.

(56) References Cited

U.S. PATENT DOCUMENTS

| | | | | |
|---|---|---|---|---|
| 4,349,403 | A | * | 9/1982 | Blenner et al. .............. 156/272.6 |
| 4,786,566 | A | * | 11/1988 | Siemers ......................... 428/568 |
| 4,859,271 | A | * | 8/1989 | Fazlin et al. ................... 156/382 |
| 4,895,491 | A | | 1/1990 | Cross et al. |
| 5,114,510 | A | * | 5/1992 | Wright ............................ 156/82 |
| 5,573,891 | A | * | 11/1996 | Sato et al. ....................... 430/323 |
| 6,239,543 | B1 | * | 5/2001 | Wakalopulos ................ 313/420 |
| 6,532,658 | B2 | | 3/2003 | Schreiber |
| 6,607,358 | B2 | | 8/2003 | Finn et al. |
| 7,513,955 | B2 | | 4/2009 | Kruger et al. |
| 2003/0098114 | A1 | * | 5/2003 | Samurkas et al. ............ 156/108 |
| 2004/0018091 | A1 | | 1/2004 | Rongong et al. |
| 2004/0108075 | A1 | * | 6/2004 | Choo et al. ..................... 156/510 |
| 2008/0152506 | A1 | | 6/2008 | Schreiber |
| 2008/0152858 | A1 | | 6/2008 | Schreiber |

FOREIGN PATENT DOCUMENTS

| | | |
|---|---|---|
| CA | 2637844 | 8/2007 |
| DE | 4407478 | 9/1994 |
| DE | 102006007428 | 8/2007 |
| DE | 102006057638 | 6/2008 |
| DE | 102006061915 | 7/2008 |
| EP | 1106783 | 6/2001 |
| EP | 1135540 | 9/2001 |
| EP | 1529765 | 5/2005 |
| EP | 1570921 | 9/2005 |
| EP | 1939402 | 7/2008 |

OTHER PUBLICATIONS

Machine Translation of EP1106783.*
German Search Report dated Aug. 31, 2009 corresponding to related German patent application.
German Search Report dated Sep. 2, 2010 from counterpart German patent application.
European Search Report dated Mar. 29, 2010 from counterpart German patent application.

* cited by examiner

*Primary Examiner* — Christopher Schatz
(74) *Attorney, Agent, or Firm* — Timothy J. Klima; Shuttleworth & Ingersoll, PLC

(57) ABSTRACT

When manufacturing hybrid components, especially the fan blades or stator vanes of an aircraft gas turbine including a metallic enveloping structure and a supporting structure in fiber-composite material, the mating faces of the metallic structure are cleaned and roughened with plasma prior to fitting the fiber-composite material and the metallic molecules activated so that high attractive forces take effect and an intimate, extremely strong adhesive connection is produced between the metal and the fiber-composite material. Fan blades or stator vanes of the fan structure of a gas-turbine engine which are manufactured according to this method are capable of transmitting high loads and feature a long service life.

8 Claims, No Drawings

METHOD FOR THE MANUFACTURE OF HYBRID COMPONENTS FOR AIRCRAFT GAS TURBINES

This application claims priority to German Patent Application DE102008058913.6 filed Nov. 25, 2008, the entirety of which is incorporated by reference herein.

This invention relates to a method for the manufacture of hybrid components, especially the fan blades or the stator vanes of the fan structure of an aircraft gas turbine, with a metallic structure being connected to a supporting structure in fiber-composite material.

It is known to design certain components of an aircraft gas turbine, e.g. the fan blades and the stator vanes of the stator vane cascade downstream of the fan in the form of a hybrid to save weight and improve vibration damping, with the hybrid including a supporting structure in fiber-composite material as well as a metallic structure fixedly connected to the latter. Fan blades made of a fiber-composite material, which combine low weight with high specific strength and high intrinsic damping to avoid vibrations, are already known from specification DE 10 2006 061 915 A1, for example. For high erosion resistance and impact strength against foreign bodies impinging on the blades, the supporting structure in fiber-composite material is connected to a metallic structure partly or completely enveloping the latter. The connection between the supporting structure and the metallic enveloping structure is provided by adhesively bonding as well as by prestressing the sheet-metal covers forming the metallic structure, in order to achieve a connection as intimate and strong as possible between the metal and the fiber-composite material.

For the manufacture of the stator vanes for the stator vane cascade of the fan structure, it has already been proposed to fill a pre-manufactured enveloping structure with fiber-composite material in an injection mold at a certain filling pressure and form the hybrid component in the process, obtaining therewith a connection as strong as possible immediately by the plastic material introduced and the pressure effect.

However, the vibrations excited by centrifugal forces, gas pressure and by the flowing medium as well as the impact effects caused by impinging foreign objects load the fan blades and stator vanes so highly that the metallic structure can detach from the supporting structure and the hybrid component becomes unserviceable and must be replaced.

In a broad aspect the present invention therefore provides a method for the manufacture of hybrid components for a gas-turbine engine which prevents the metallic structure from separating from the fiber-composite material under the extreme load conditions in a gas-turbine engine.

The present invention, which generally relates to the manufacture of hybrid components and here, in particular, a supporting structure made of fiber-composite material and enclosed by sheet-metal covers for the fan blades or stator vanes of an aircraft gas turbine, essentially provides that the mating faces of the metallic structure, before fitting the fiber-composite material, are cleaned and roughened with plasma and the metallic molecules activated so that high attractive forces take effect and an intimate, extremely strong adhesive connection is produced between the metal and the fiber-composite material. Surprisingly, the strength of the adhesive connection, as compared to the connections known so far, is multiplied. Fan blades or stator vanes of the fan structure of a gas-turbine engine which are manufactured according to this method are capable of transmitting high loads and feature a long service life.

In development of the present invention, the plasma treatment of the metallic mating faces is performed by a plasma jet exiting from nozzles. Preferably, the plasma jet is an ionized air stream.

In further development of the present invention, the metallic mating faces can be mechanically roughened prior to the plasma treatment.

In an advantageous development of the present invention, foil-like, plane sheet-metal covers treated on their inner surfaces with plasma are weldedly joined to each other and a still flowable fiber-composite material is introduced between the two sheet-metal covers at a certain filling pressure in a mold conforming to the shape of the component so that the component is formed to the shape of the mold.

In further development of the present invention, sheet-metal covers pre-formed according to the shape of component are treated with plasma on their inner surfaces and, upon introduction of the fiber material, weldedly joined to each other, with a plastic material being subsequently infiltrated into the fiber material according to the RTM process.

The plasma treated sheet-metal covers can also be joined to a pre-manufactured supporting structure in fiber-composite material using an adhesive and subsequently weldedly joined to each other at the edges.

In this case, also the supporting structure can be treated at the mating faces in the same way as the metallic structure.

The method according to the present invention for the manufacture of the stator vanes for a stator vane cascade arranged downstream of the fan of an aircraft gas turbine is hereinafter explained in more detail by way of an exemplary embodiment.

Two foil-like sheet-metal covers in chromium-nickel steel which are plane on the suction side and on the pressure side and cut in accordance with the shape of the stator vanes are treated on the inner surface with a plasma jet, here ionized air, issuing from a nozzle and being passed over the entire surface. In the process, the inner surfaces of the sheet-metal covers are cleaned and roughened—recognizable by the matte appearance. Subsequently, one each suction-side sheet-metal cover and one each pressure-side sheet-metal cover are, with their inner surfaces facing each other, weldedly joined to each other at the longitudinal edges, i.e. the later leading and trailing edges of the stator vane. The metallic structure so prepared is placed in an injection mold whose inner contour conforms to the outer contour of the three-dimensional stator vane. In the closed injection mold, a polyamide containing a fiber material is introduced at a certain pressure into the space between the two sheet-metal covers. In the process, the sheet-metal covers are formed in accordance with the inner contour of the injection mold. Upon removal from the injection mold, the leading edge and the trailing edge (welding edges) are machined and the upper and the lower edges of the vane trimmed in accordance with the desired vane length. Surprisingly, it has been found in numerous investigations that, as compared to the known methods without plasma treatment of the metallic surface, the surface treatment with ionized air dramatically increases, i.e. multiplies, the strength of the bond between the metallic structure and the plastic material (fiber-composite material), thereby enabling the service life of the stator vanes to be considerably extended. Also, surprisingly, it has also been found that the strength of the bond between metal and plastic material still further increases after a certain period of time.

The present invention is not limited to the above described exemplary embodiment. Other hybrid components in which metal is connected to plastic material or fiber-composite material, for example the highly loaded fan blades of the aircraft gas turbine, can likewise be manufactured on the basis of the cleaning and roughening of the mating faces of the metallic structure (metallic enveloping structure) using a plasma jet according to the present invention. For example, for the manufacture of fan blades, sheet-metal covers pre-formed in accordance with the three-dimensional blade contour can initially be roughened with plasma on their inner surfaces and, upon fitting the fiber material, weldedly joined to each other. Subsequently, the plastic material is infiltrated according to the RTM process into the fiber material provided between the two sheet-metal covers.

Furthermore, the pre-formed sheet-metal covers treated with plasma on their inner surfaces can also be joined to a pre-manufactured supporting structure in fiber-composite material by use of an adhesive. Also in this case, an astonishingly strong connection between the metallic structure and the fiber-composite material could be achieved by influencing the surface condition of the metallic structure by plasma.

What is claimed is:

1. A method for manufacturing a hybrid component, comprising:
    applying plasma to at least one face of a metallic structure by directing a jet of air from a nozzle onto the at least one face of the metallic structure and including in the jet of air a plasma of ionized air to activate metallic molecules of the at least one face to increase attractive forces of the metallic molecules;
    subsequently, bringing the at least one face having the activated metallic molecules into direct contact with a supporting structure of plastic fiber-composite material to create a bond connection between the at least one face and the supporting structure of plastic fiber-composite material;
    wherein the component is at least one chosen from a fan blade and a stator vane of a fan structure of an aircraft gas turbine;
    wherein the metallic structure includes a single layer sheet metal cover having a first surface forming an exterior surface of the hybrid structure, an opposite second surface forming an interior surface of the metallic structure and a solid thickness between the first surface and the second surface, the at least one face brought into direct contact with the supporting structure of plastic fiber-composite material consisting of the second surface of the sheet metal cover, such that the bond connection consists of the second surface and the supporting structure of plastic fiber-composite material.

2. The method of claim 1, and further comprising mechanically roughening the at least one face prior to the plasma treatment.

3. The method of claim 2, wherein the metallic structure includes at least two sheet metal covers pre-formed to a desired shape of the component and the at least one plasma applied face is inner surfaces of the sheet metal covers, and further comprising introducing fiber material between the sheet metal covers, welding the sheet metal covers to each other, and subsequently infiltrating a plastic material into the fiber material.

4. The method of claim 1, wherein the metallic structure includes at least two sheet metal covers pre-formed to a desired shape of the component and the at least one plasma applied face is inner surfaces of the sheet metal covers, and further comprising introducing fiber material between the sheet metal covers, welding the sheet metal covers to each other, and subsequently infiltrating a plastic material into the fiber material.

5. The method of claim 1, wherein applying the plasma cleans and roughens the at least one face.

6. A method for manufacturing a hybrid component, comprising:
    providing a metallic structure;
    subsequently applying plasma to at least one face of the metallic structure by directing a jet of air from a nozzle onto the at least one face of the metallic structure and including in the jet of air a plasma of ionized air to activate metallic molecules of the at least one face to increase attractive forces of the metallic molecules;
    subsequently, bringing the at least one face having the activated metallic molecules into direct contact with a supporting structure of plastic fiber-composite material to create a strong adhesive connection between the at least one face and the supporting structure of plastic fiber-composite material;
    wherein the metallic structure includes at least two sheet metal covers pre-formed to a desired shape of the component;
    wherein the component is at least one chosen from a fan blade and a stator vane of a fan structure of an aircraft gas turbine;
    wherein the at least two metallic sheet metal covers each include a single layer including a first surface forming an exterior surface of the hybrid structure, an opposite second surface forming an interior surface of the metallic structure and a solid thickness between the first surface and the second surface, the at least one face brought into direct contact with the supporting structure of plastic fiber-composite material consisting of the second surface of each sheet metal cover, such that the bond connection consists of the second surface of each sheet metal cover and the supporting structure of plastic fiber-composite material.

7. The method of claim 6, wherein the at least one plasma applied face is inner surfaces of the sheet metal covers, and further comprising introducing fiber material between the sheet metal covers, welding the sheet metal covers to each other, and subsequently infiltrating a plastic material into the fiber material.

8. A method for manufacturing a hybrid component, comprising:
    applying plasma to at least one face of a metallic structure by directing a jet of air from a nozzle onto the at least one face of the metallic structure and including in the jet of air a plasma of ionized air to activate metallic molecules of the at least one face to increase attractive forces of the metallic molecules;
    subsequently, bringing the at least one face having the activated metallic molecules into direct contact with a supporting structure of plastic fiber-composite material to create a bond connection between the at least one face and the supporting structure of plastic fiber-composite material;
    wherein the component is at least one chosen from a fan blade and a stator vane of a fan structure of an aircraft gas turbine;
    wherein the metallic structure includes a single layer sheet metal cover having a first surface forming an exterior surface of the hybrid structure, an opposite second surface forming an interior surface of the metallic structure and a solid thickness between the first surface and the second surface, the at least one face brought into direct contact with the supporting structure of plastic fiber-composite material consisting of the second surface of the sheet metal cover, such that the bond connection consists of the second surface and the supporting structure of plastic fiber-composite material.

\* \* \* \* \*